United States Patent
Kang

(10) Patent No.: US 12,499,855 B2
(45) Date of Patent: Dec. 16, 2025

(54) SINK DEVICE AND OPERATING METHOD THEREOF

(71) Applicant: LG ELECTRONICS INC., Seoul (KR)

(72) Inventor: Heechen Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 4 days.

(21) Appl. No.: 18/652,235

(22) Filed: May 1, 2024

(65) Prior Publication Data

US 2025/0292745 A1 Sep. 18, 2025

(30) Foreign Application Priority Data

Mar. 12, 2024 (KR) .................. 10-2024-0034769

(51) Int. Cl.
*G09G 5/12* (2006.01)
*G09G 5/00* (2006.01)
*H04N 21/4363* (2011.01)

(52) U.S. Cl.
CPC .............. *G09G 5/12* (2013.01); *G09G 5/006* (2013.01); *H04N 21/43635* (2013.01); *G09G 2370/12* (2013.01)

(58) Field of Classification Search
CPC ...... G09G 5/12; G09G 5/006; G09G 2370/12; H04N 21/43635
See application file for complete search history.

(56) References Cited

U.S. PATENT DOCUMENTS

| 8,214,730 B2 | 7/2012 | Masumori | |
|---|---|---|---|
| 2013/0201397 A1* | 8/2013 | Ayoub | H04R 5/04 381/74 |
| 2021/0177290 A1* | 6/2021 | Jung | G06F 1/1684 |
| 2023/0336806 A1* | 10/2023 | Lu | G06F 3/0481 |

FOREIGN PATENT DOCUMENTS

| CN | 114286143 | 4/2022 |
|---|---|---|
| KR | 10-0677162 | 2/2007 |
| WO | 2017-151925 | 9/2017 |

OTHER PUBLICATIONS

European Patent Office Application Serial No. 24173941.6, Search Report dated Sep. 24, 2024, 9 pages.

* cited by examiner

*Primary Examiner* — Robert J Michaud
(74) *Attorney, Agent, or Firm* — LEE, HONG, DEGERMAN, KANG & WAIMEY

(57) ABSTRACT

The sink device according to an embodiment of the present disclosure comprises a memory, an external device interface configured to receive a signal output from a source device through the HDMI (High-Definition Multimedia Interface) standard and a controller configured to obtain identification information of the source device, determine whether a delay timing value matched the identification information of the source device is stored in the memory, and delay the first signal received from the source device based on the delay timing value if the delay timing value matched the identification information of the source device is stored in the memory.

18 Claims, 14 Drawing Sheets

| Source device | Delay timing value (us) |
|---|---|
| HDMI A | 500 |
| HDMI B | 3 |
| HDMI C | 1300 |

SINK DEVICE AND OPERATING METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2024-0034769, filed on Mar. 12, 2024, the contents of which are all hereby incorporated by reference herein in their entireties.

BACKGROUND OF THE INVENTION

1. Field of the Invention

This disclosure relates to a sink device, and more specifically, to a sink device that receives a signal from a source device through the HDMI standard.

2. Discussion of the Related Art

HDMI (High-Definition Multimedia Interface) is one of the uncompressed digital video/audio interface standard. A sink device, such as a display device, receives video/audio signals from the source device through the HMDI standard.

When receiving a signal from a source device through the HDMI 2.1 standard, video defect (no video or flicker) and audio interruption may occur depending on the output condition.

This is because there is a stabilization period (variable period) of the output signal under the FRL (Frame Rate Link) mode of the HDML 2.1 standard. The stabilization period is a period to reduce the standby power consumption of the source device, and in this period, the operation of turning off the power of the HDMI output IC is performed.

It is expected that there will be various types of stabilization period depending on the type of external device of the HDMI 2.1 standard.

When the sink device performs equalizer (EQ) setting for the stabilization period, the EQ value becomes distorted, causing video and audio defects.

As a result, user experiences inconvenience in viewing video and in listening audio.

SUMMARY OF THE INVENTION

The purpose of this disclosure is to improve equipment compatibility issue (video/audio interruption) that may occur when connecting an external device of the HDMI 2.1 standard.

The purpose of the present disclosure is to prevent video defect and audio defect caused by the stabilization period of the signal output by the external device when connecting an external device of the HDMI 2.1 standard.

The purpose of this disclosure is to respond to signal output from various types of external device using the HDMI 2.1 standard.

The sink device according to an embodiment of the present disclosure comprises a memory, an external device interface configured to receive a signal output from a source device through the HDMI (High-Definition Multimedia Interface) standard and a controller configured to obtain identification information of the source device, determine whether a delay timing value matched the identification information of the source device is stored in the memory, and delay the first signal received from the source device based on the delay timing value if the delay timing value matched the identification information of the source device is stored in the memory.

An operating method of a sink device device according to an embodiment of the present comprises obtaining identification information of a source device, determining whether a delay timing value matched the identification information of the source device is stored and if a delay timing value matched the identification information of the source device is stored, delaying the first signal received from the source device through the High-Definition Multimedia Interface (HDMI) standard based on the delay timing value.

According to an embodiment of the present disclosure, a signal corresponding to the stabilization period of an external device is not output, so interruption of video and audio may be prevented in advance. Accordingly, user may watch video and audio stably.

Additionally, user may enjoy the experience of stabilizing the output of various types of HDMI external device without any additional action.

Additionally, users may set the maximum resolution output of external device and experience the highest tier video blurr level.

BRIEF DESCRIPTION OF THE DRAWINGS

FIG. 5 is a diagram illustrating a delay timing table according to an embodiment of the present disclosure.

FIGS. 8A to 8D are diagrams illustrating a process for obtaining a delay timing value according to an embodiment of the present disclosure.

DETAILED DESCRIPTION OF THE PREFERRED EMBODIMENTS

Figure 1:
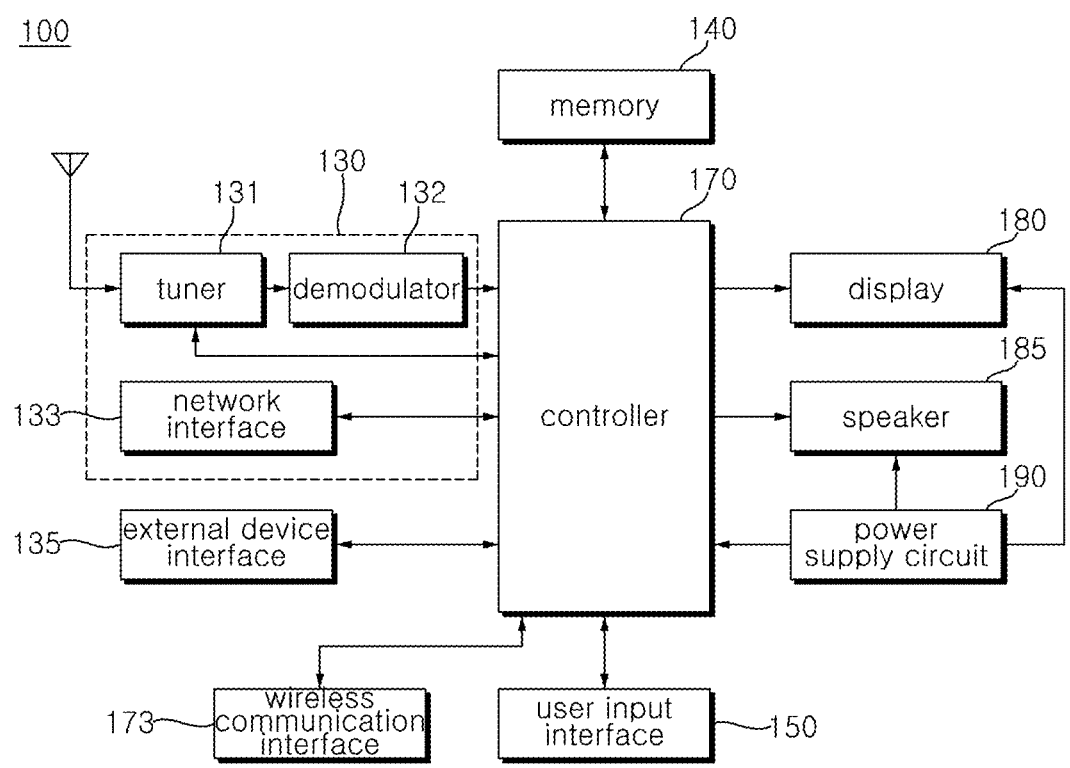
FIG. 1 is a block diagram showing the configuration of a display device according to an embodiment of the present invention.

Hereinafter, the present disclosure will be described in more detail with reference to the drawing.

Hereinafter, embodiments of the present disclosure will be described in detail with reference to the drawings. The suffixes "module" and "unit or portion" for elements used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games may also be performed. A standardized general-purpose OS may be used for these various functions.

Accordingly, in the display device described in the present disclosure, various user-friendly functions may be performed because various applications may be freely added or deleted, for example, on a general-purpose OS kernel. More specifically, the display device may be, for example, a network TV, HBBTV, smart TV, LED TV, OLED TV, and the like, and may be applied to a smart phone in some cases.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated elements may be integrated, added, or omitted depending on the specification of the display device 100 that is actually implemented.

That is, two or more elements may be combined into one component, or one component may be divided into two or more elements as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the speaker 185.

Figure 2:
FIG. 2 is a diagram illustrating the configuration of an HDMI system according to an embodiment of the present disclosure.

FIG. 2 is a diagram illustrating the configuration of an HDMI system according to an embodiment of the present disclosure.

The HDMI system 2 may include a source device 10 and a sink device 20.

The source device 10 may transmit a signal to the sink device 20 through the High Definition Multimedia Interface (HDMI) standard. Specifically, the source device 10 may transmit an output signal to the sink device 20 in a FRL (Fixed Rate Link) mode through the HMDI 2.1 standard.

The sink device 20 may output a signal received from the source device 10.

The display device 100 of FIG. 1 is an example of a sink device 20. The sink device 20 may include all elements of the display device 100.

The source device 10 may be connected to the sink device 20 through an HDMI cable.

The source device 10 may be an external device such as a set-top box, a game console, a laptop, or a smartphone.

The sink device 20 may be an electronic device such as a display device 100, a smart pad, a smartphone, or a PC.

Figure 3:
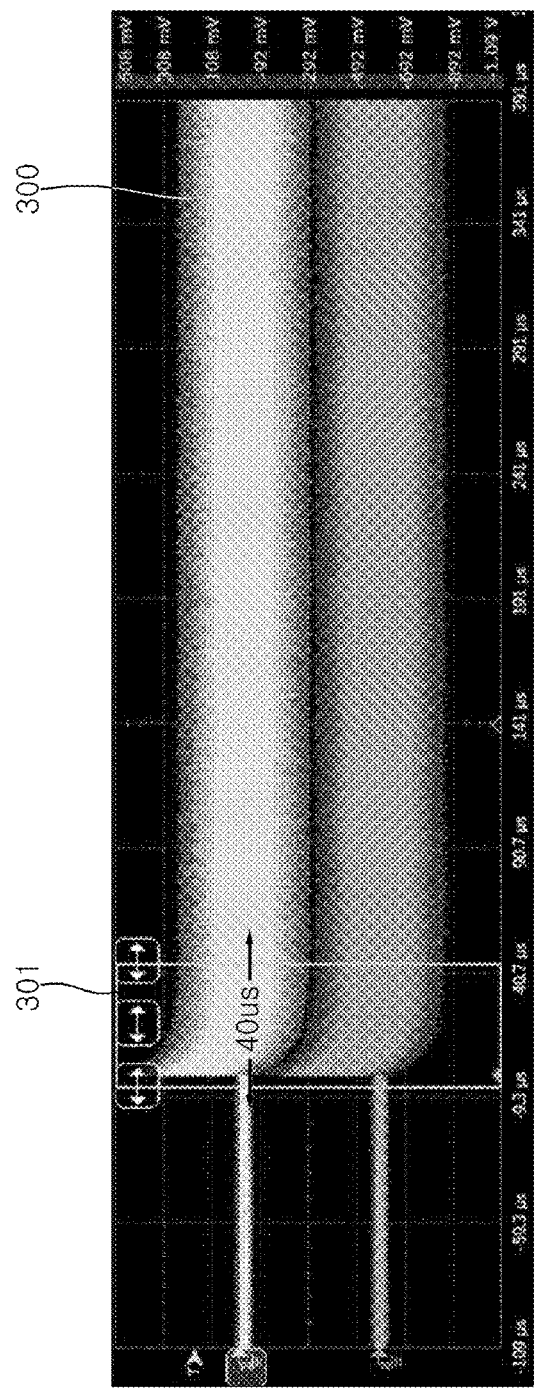
FIG. 3 is a diagram illustrating a problem that occurs due to the stabilization period of the signal output from the source device when a conventional source device is connected to a sink device through the HDMI standard.

FIG. 3 is a diagram illustrating a problem that occurs due to the stabilization period of the signal output from the source device when a conventional source device is connected to a sink device through the HDMI standard.

The source device is outputting a signal 301 under FRL (Fixed Rate Link) mode through the HDMI 2.1 standard. FRL mode may be a signal transmission mode that realizes high uncompressed resolution such as 8K and ultra-high-speed bandwidth of up to 48 Gbps.

The sink device receives the output signal 300. There is a stabilization period (or variable period, 300) in the signal 300. The stabilization period is a period to reduce the standby power consumption of the source device, and in this period, the operation of turning off the power of the IC that outputs the HDMI signal is performed.

Because of this, the signal 300 has a curve-shaped stabilization period 301 whose magnitude varies. When the sink device performs equalizer settings to amplify the amplitude of the received signal 300, the equalizer setting value becomes distorted due to the stabilization period 301.

Accordingly, during the stabilization period 301, flickering occurs in the image output by the sink device or audio interruption occurs.

In an embodiment of the present disclosure, a stabilization period output from various types of source device is detected and only signal after the stabilization period is output.

Figure 4:
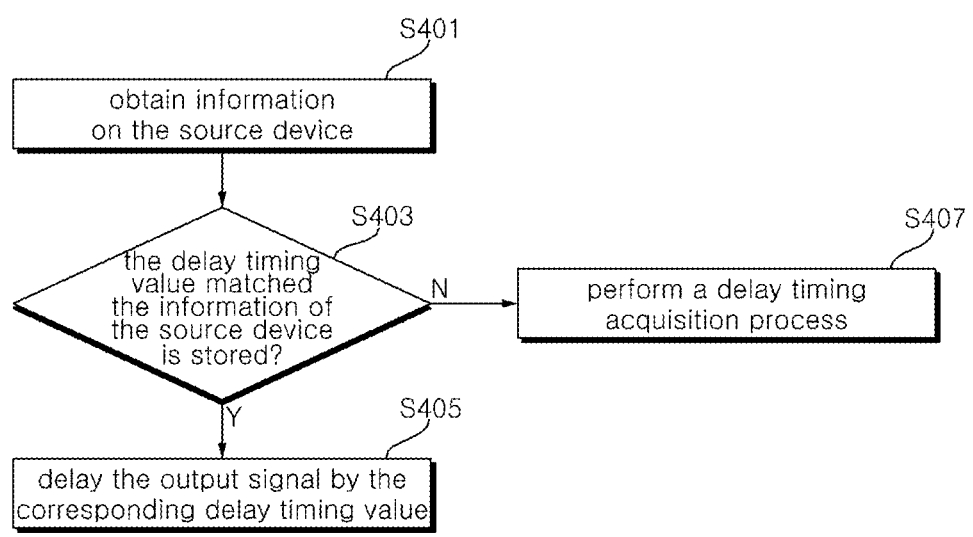
FIG. 4 is a flowchart illustrating a method of operating a sink device according to an embodiment of the present disclosure.

FIG. 4 is a flowchart illustrating a method of operating a sink device according to an embodiment of the present disclosure.

Referring to FIG. 4, the controller 170 of the sink device 20 may obtain information on the source device 10 (S401).

Information on the source device 10 may include identification information to identify the source device 10.

In one embodiment, the information on the source device 10 may be SPD (Source Product Description) information. The controller 170 may receive SPD information in the format of SPD InfoFrame from the source device 10 through the HDMI standard.

The source device 10 may be connected to the HDMI terminal of the external device interface 135 of the sink device 20 through an HDMI cable.

Information on the source device 10 may include one or more of system information or specification information of the source device 10. Information on the source device 10 may include one or more of the manufacturer name and model name of the source device 10.

The controller 170 may determine whether the delay timing value matched the information of the source device 10 is stored in the memory 140 (S403).

The memory 140 may store information on each of a plurality of source devices and a delay timing value matched to each information.

Memory 140 may store a delay timing table. The delay timing table may be a table representing the correspondence between the identification information of the source device 10 and the delay timing value matched to the identification information.

The delay timing value may be a value indicating how much the signal received from the source device 10 will be delayed under the FRL mode of the HDMI 2.1 standard.

FIG. 5 is a diagram illustrating a delay timing table according to an embodiment of the present disclosure.

The delay timing table 500 may be stored in the memory 140.

The delay timing table 500 may include identification information of the source device 10 and a delay timing value matched to the identification information.

For example, the identification information of a source device called HDMI A may be matched to a delay timing value of 500 (us). The identification information of the source device called HDMI B may be matched to the delay timing value of 3 (us). The identification information of the source device called HDMI C may be matched to the delay timing value of 1300 (us).

The sink device 20 may generate the delay timing table 500 through a delay timing acquisition process that will be described later.

Again, FIG. 4 will be described.

When the controller 170 determines that a delay timing value matching the information of the source device 10 is stored in the memory 140, the controller 170 may delay to output the output signal received from the source device 10 by the corresponding delay timing value (S405).

The controller 170 may read the delay timing value matched to the information of the source device 10 and delay the output signal by the read delay timing value. This is to prevent video and audio defects by excluding the output of the stabilization period included in the delay period.

If it is determined that the delay timing value matching the information of the source device 10 is not stored in the memory 140, the controller 170 performs a delay timing acquisition process (S407).

The delay timing acquisition process may be a process of acquiring the delay timing value of a signal received from the source device 10 connected to the sink device 20.

The delay timing acquisition process will be described with reference to FIG. 6.

Figure 6:
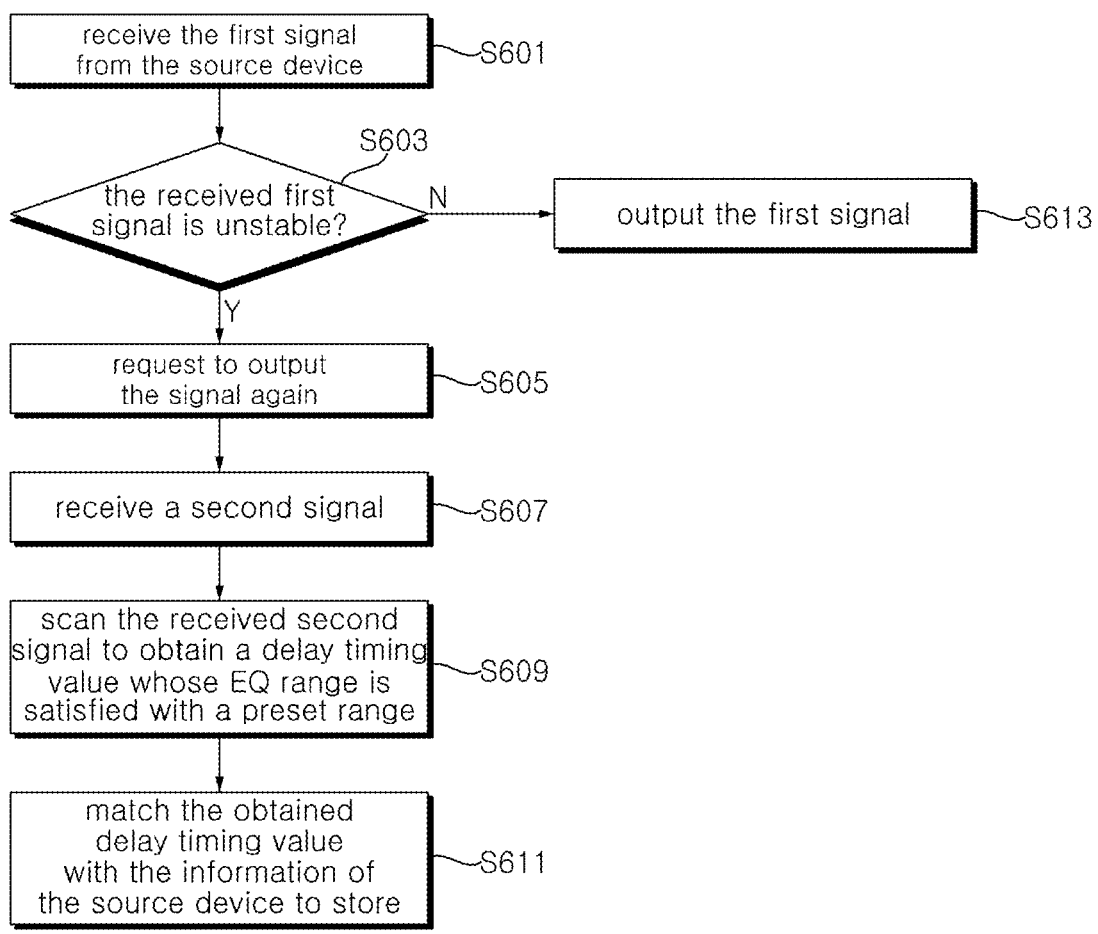
FIG. 6 is a flowchart illustrating a method of obtaining a delay timing value according to an embodiment of the present disclosure.

FIG. 6 is a flowchart illustrating a method of obtaining a delay timing value according to an embodiment of the present disclosure.

FIG. 6 is a diagram specifying step S407 of FIG. 4.

Referring to FIG. 6, the controller 170 of the sink device 20 receives the first signal from the source device 10 (S601).

The first signal may be a signal received under the FRL mode of the HDMI 2.1 standard.

The controller 170 may receive the first signal from the source device 10 through the external device interface 135.

The controller 170 may determine whether the received first signal is unstable (S603).

In one embodiment, the controller 170 may determine that the first signal is stable when the EQ range of the eye signal corresponding to the first signal is more than a preset range, and determine that the first signal is unstable if the EQ range of the eye signal corresponding to the first signal is less than a preset range.

The eye signal may be a signal that represents the overlapping voltage waveform of the signal on the time axis based on 1 UI. Here, 1 UI may be defined as 0.5*1/(frequency).

Figure 7A:
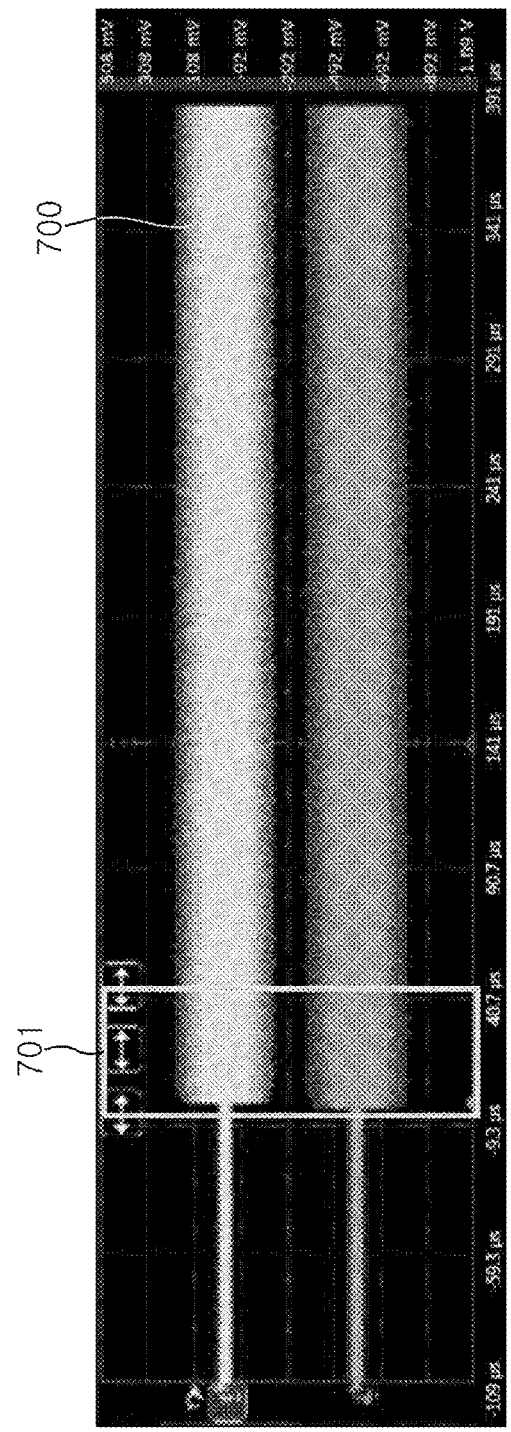
FIGS. 7A to 7C are diagrams illustrating a process for determining whether a signal received from a source device is unstable.
Figure 7B:
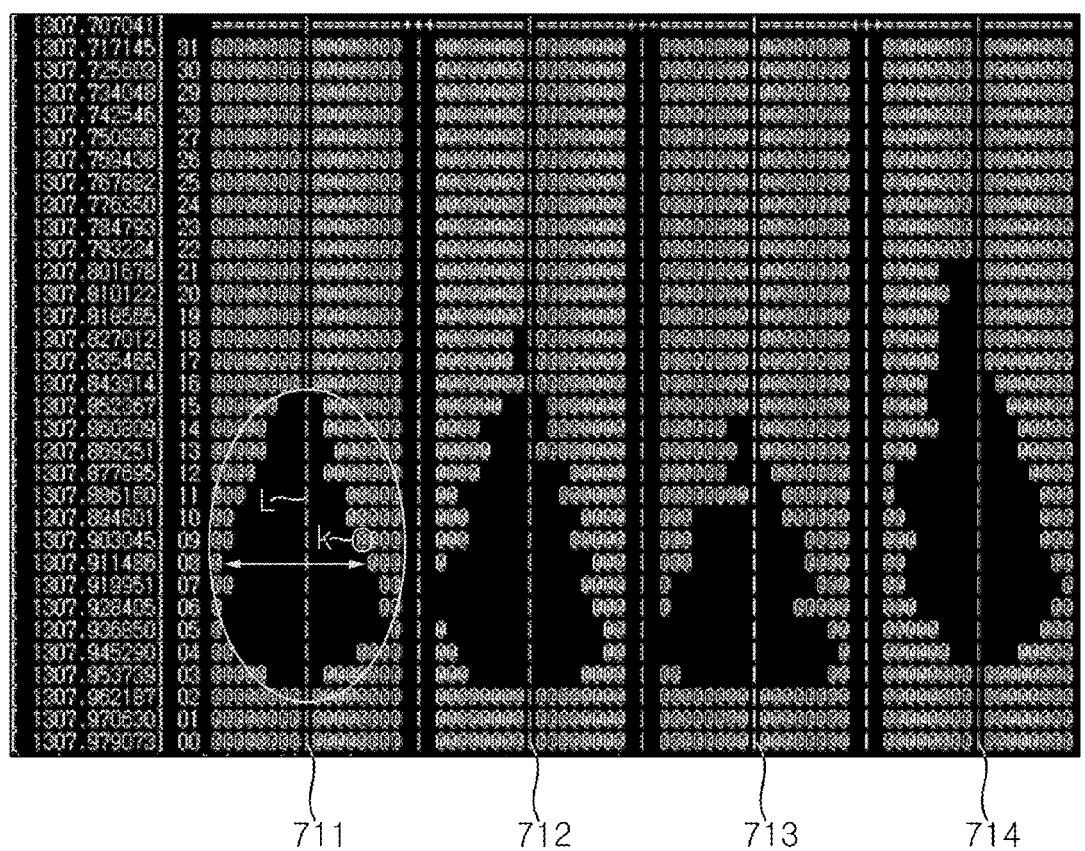
Figure 7C:
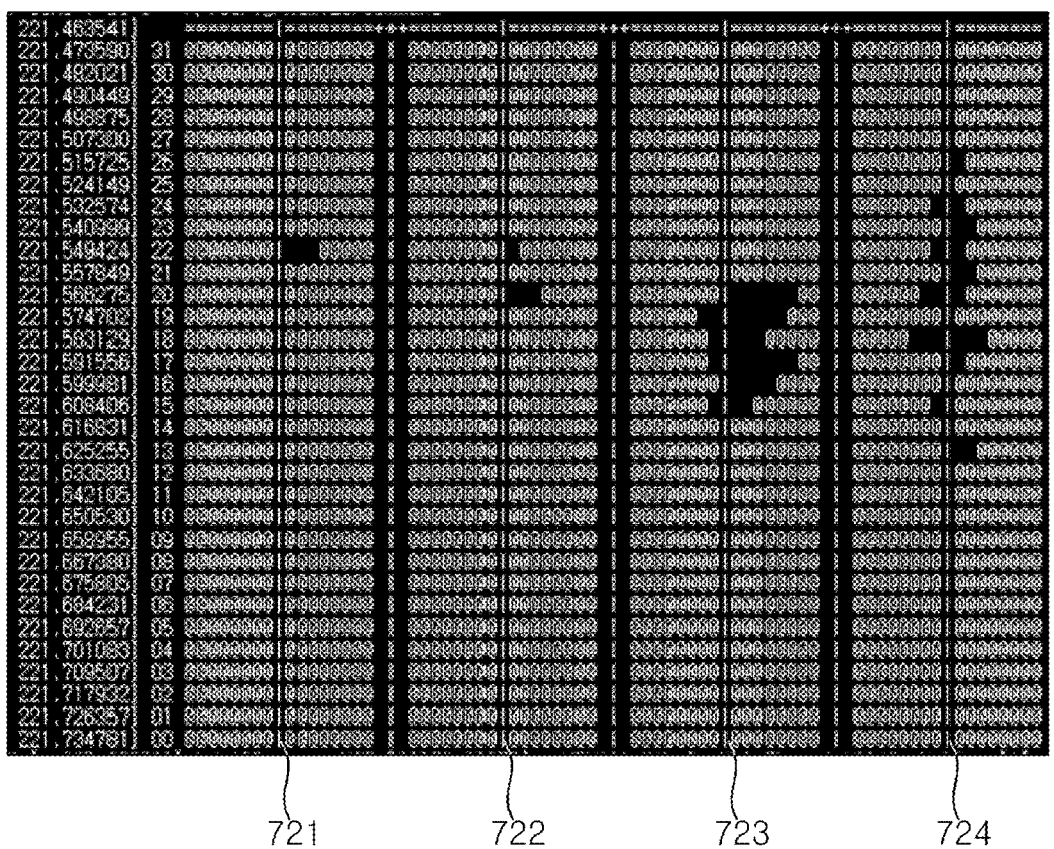

FIGS. 7A to 7C are diagrams illustrating a process for determining whether a signal received from a source device is unstable.

Referring to FIG. 7A, the source device 10 outputs the first signal 700 under the FRL mode of the HDMI 2.1 standard. The sink device 20 may acquire an eye signal corresponding to a partial period 701 of the first signal 700.

If the EQ range of the eye signal corresponding to a partial period 701 of the first signal 700 is less than a preset range, the sink device 20 may determine that the first signal is an unstable signal. Here, the preset range may be 3-tab, but it is only an example.

1 tab is one unit (K) shown in FIG. 7B.

The sink device 20 may determine that the signal is unstable when the EQ range of any one eye of the eye signals received through each of the four channels is less than a preset range. The first signal 700 may be a signal received in any one of four channels.

FIG. 7B shows eye signals 711 to 714 of signals received from the source device 10 through each of the four channels of HDMI 2.1.

The sink device 20 may determine the eye signal 711 to be a normal signal because the left and right sides of the eye signal 711 are each 3 tabs or more around the center line (L).

Likewise, since the EQ range of each of the remaining eye signals 712 to 714 is 3 tabs or more, the sink device 20 may determine that the signals received from the source device 10 are normal.

FIG. 7C shows eye signals 721 to 724 of other signals received from the source device 10 through each of the four channels of HDMI 2.1. Since the EQ range of each of the eye signals 721 to 724 is less than 3 tabs centered on the center line, the sink device 20 may determine that the signals received from the source device 10 are unstable.

Again, FIG. 6 will be described.

If it is determined that the received first signal is unstable, the controller 170 may request the source device 10 to output the signal again (S605).

If it is determined that the first signal is unstable, the controller 170 may re-request the signal output from the source device 10 through the HPD (Hot Plug Detection) toggle.

The controller 170 receives a second signal from the source device 10 in response to a re-request for signal output (S607).

The second signal may be a signal received from the source device 10 under the FRL mode of the HDMI 2.1 standard.

The controller 170 may scan the received second signal to obtain a delay timing value whose EQ range is less than a preset range (S609).

The controller 170 may scan the second signal a preset number of times at different time points and determine whether the EQ range of the scanned period is within the preset range.

The preset number of times may be 3, and 3 scans may be performed within 2000 us. However, there is no need to be limited to this, and the number of scans may be three or more.

The controller 170 may determine whether the EQ range of the eye signal of each signal obtained through three scans is within a preset range.

For example, the controller 170 may scan the second signal at timings of 3 us, 500 us, or 1900 us from the time point of receiving the second signal. each of 3 us, 500 us, and 1900 us may be scan point.

The controller 170 may determine whether the EQ range of the eye signal is within a preset range in the period at each scan point. The controller 170 may obtain one or more scan points where the EQ range of the eye signal is within a preset range.

The controller 170 may determine the smallest value (fastest scan) among one or more acquired scan points as the delay timing value. The reason for determining the smallest value among one or more scan points as the delay timing value is to minimize the delay in signal output.

For example, if the scan points where the EQ range of the eye signal is within a preset range are 500 us and 1900 us, the controller 170 may determine 500 us as the delay timing value.

The controller 170 may match the obtained delay timing value with the information of the source device 10 and store it in the memory 140 (S611).

The controller 170 may match the obtained delay timing value with the SPD information of the source device 10 and store it in the memory 140. Through this process, the controller 170 may generate the delay timing table 500 as shown in FIG. 5.

When the source device 10 is connected through the HDMI 2.1 standard, the controller 170 may extract a delay timing value matching the SPD information of the source device 10. The controller 170 may use the extracted delay timing value to delay the signal received from the source device 10 by the delay timing value and output the deplayed signal.

Meanwhile, if the controller 170 determines that the received first signal is stable, the controller 170 may output the first signal (S613).

The controller 170 may extract the video component of the first signal to output the extracted video component to the display 180, and extract the audio component of the first signal to output the extracted audio component to the speaker 185.

FIGS. 8A to 8D are diagrams illustrating a process for obtaining a delay timing value according to an embodiment of the present disclosure.

Figure 8A:
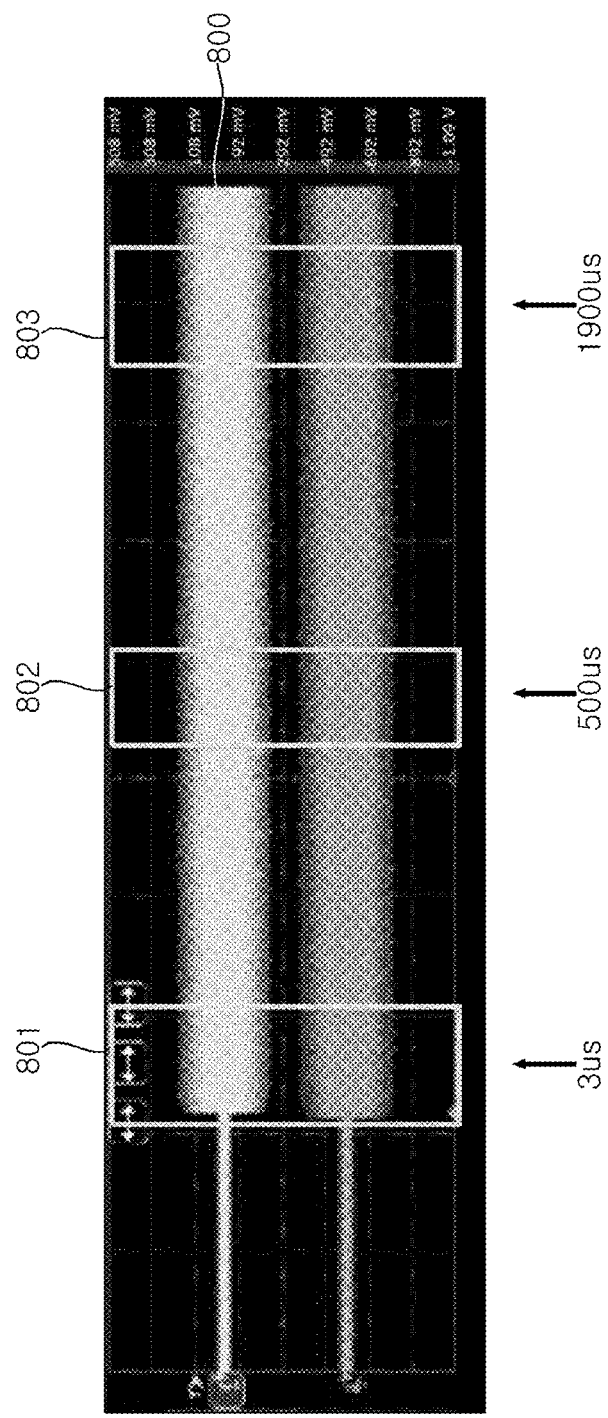

Referring to FIG. 8A, a second signal 800 output from the source device 10 under the FRL mode of the HDMI 2.1 standard is shown.

If the first signal received from the source device 10 is determined to be unstable, the controller 170 may receive the second signal 800 in response to a re-request for signal output.

The controller 170 may perform three scans on the second signal 800. The controller 170 may actually perform three scans for each of the signals input from four channels. The second signal 800 may be a signal received in any one of four channels.

The controller 170 may scan the second signal 800 at each of the first scan point (3 us), the second scan point (500 us), and the third scan point (1900 us).

The numbers at the first to third scan points are merely examples. The controller 170 may randomly determine three scan points.

The controller 170 may determine whether the EQ range of the eye signal for the period acquired at each scan point is within a preset range.

Figure 8B:
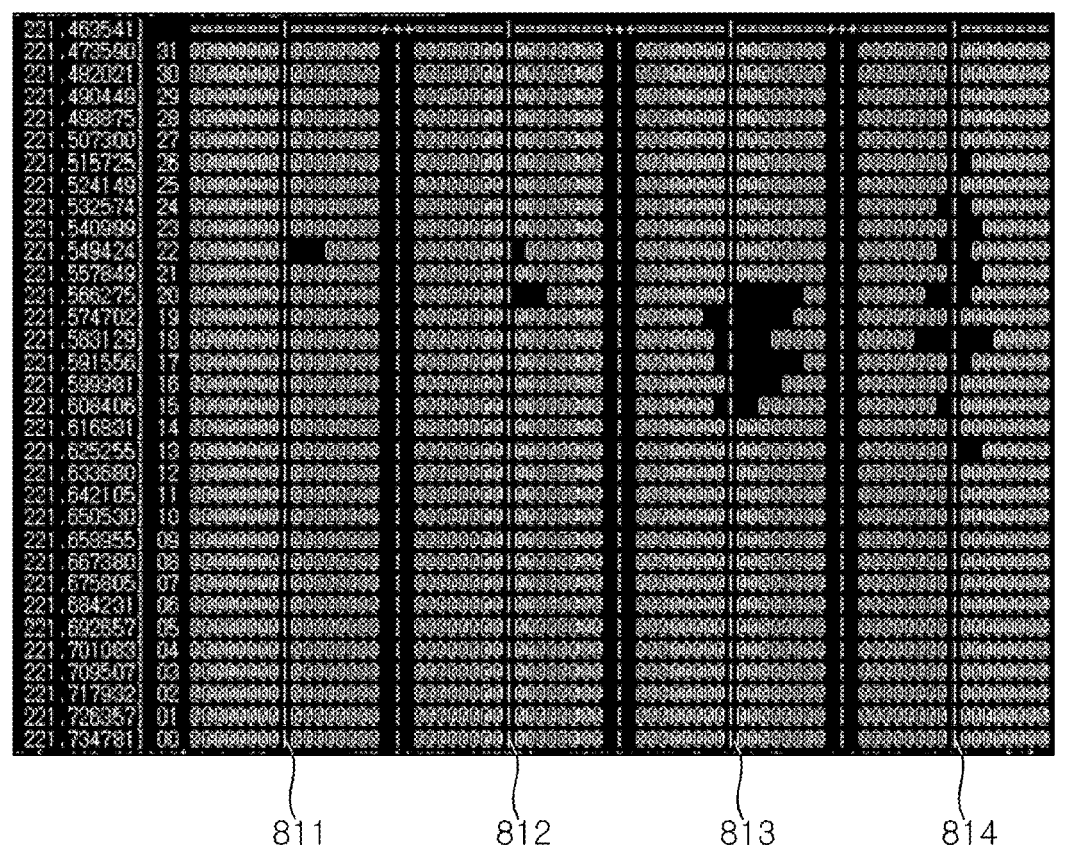
Figure 8C:
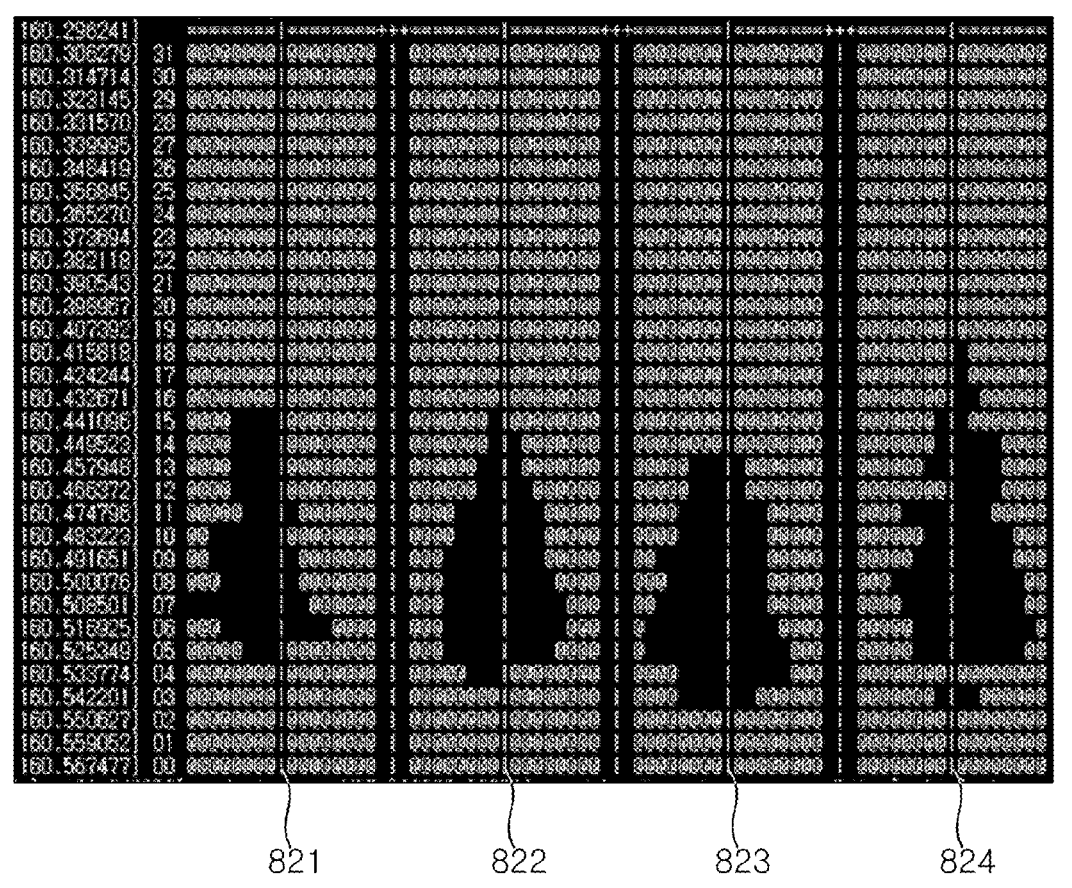
Figure 8D:
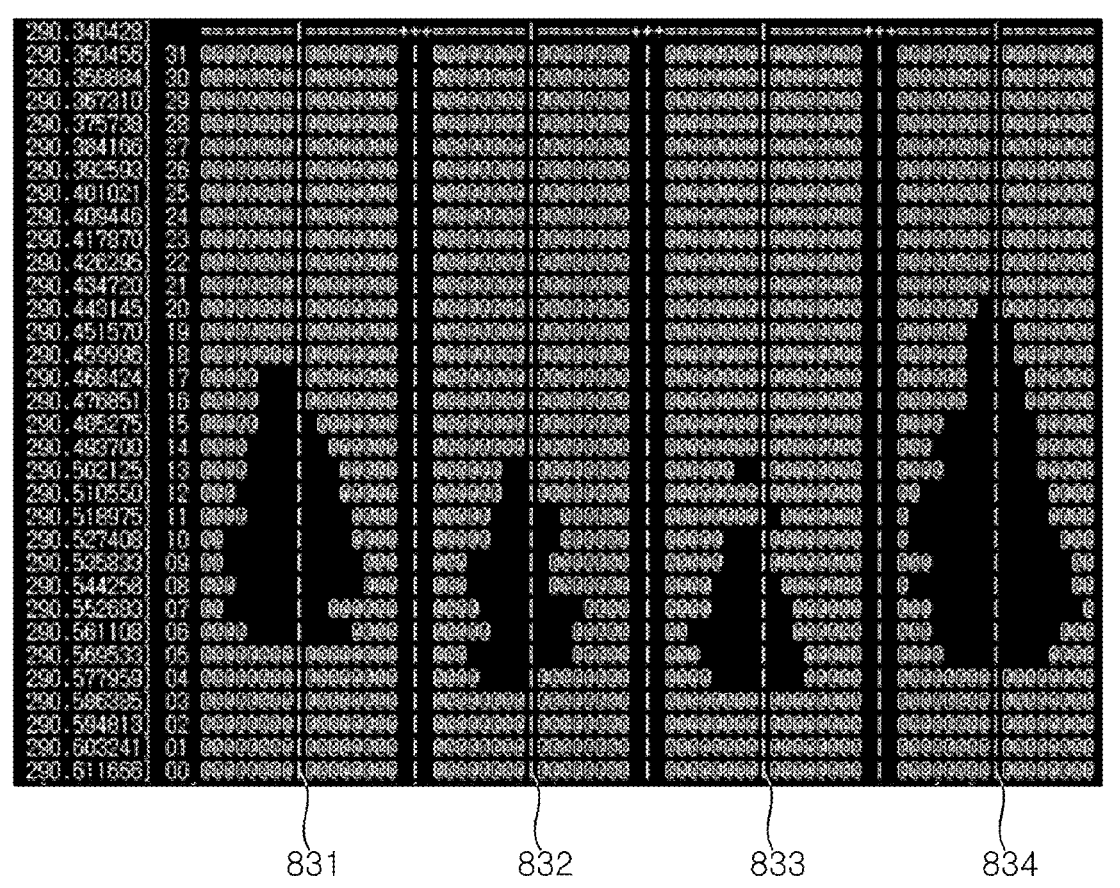

FIG. 8B shows eye signals 811 to 814 of the period scanned at the first scan point, FIG. 8C shows eye signals 821 to 824 of the period scanned at the second scan point, and FIG. 8D shows eye signals 831 to 834 of the period scanned at the third scan point.

If the EQ range of the eye signal 811 of the period scanned at the first scan point of the second signal 800 is within a preset range, the controller 170 may exclude the first scan point from the storage candidate. That is, the controller 170 may determine that the signal output is unstable.

If the EQ range of the eye signal 821 of the period scanned at the second scan point of the second signal 800 exceeds the preset range, the controller 170 may include the second scan point in the storage candidate. That is, the controller 170 may determine that the signal output is in a normal state.

If the EQ range of the eye signal 821 of the period scanned at the third scan point of the second signal 800 exceeds the preset range, the controller 170 may include the third scan point in the storage candidate. That is, the controller 170 may determine that the signal output is in a normal state.

The controller 170 may determine the earlier of the second scan point and the third scan point as the scan point to be stored in the memory 140. The controller 170 may match the second scan point to the SPD information of the source device 10 and store it in the memory 140.

When the source device 10 is reconnected through the HDMI 2.1 standard and the scan point matching the SPD information of the source device 10 is stored in the memory 140, the controller 170 reads the scan point.

The controller 170 may delay the signal received from the source device 10 by the read scan point to output the delayed signal. This is because the delay period includes the above-mentioned stabilization period and does not output a signal corresponding to the stabilization period.

As such, according to the embodiment of the present disclosure, the signal corresponding to the stabilization period of the source device 10 is not output, so interruption of video and audio may be prevented in advance. Accordingly, users may enjoy the experience of stabilizing the output of various types of HDMI source device without any additional action.

Figure 9:
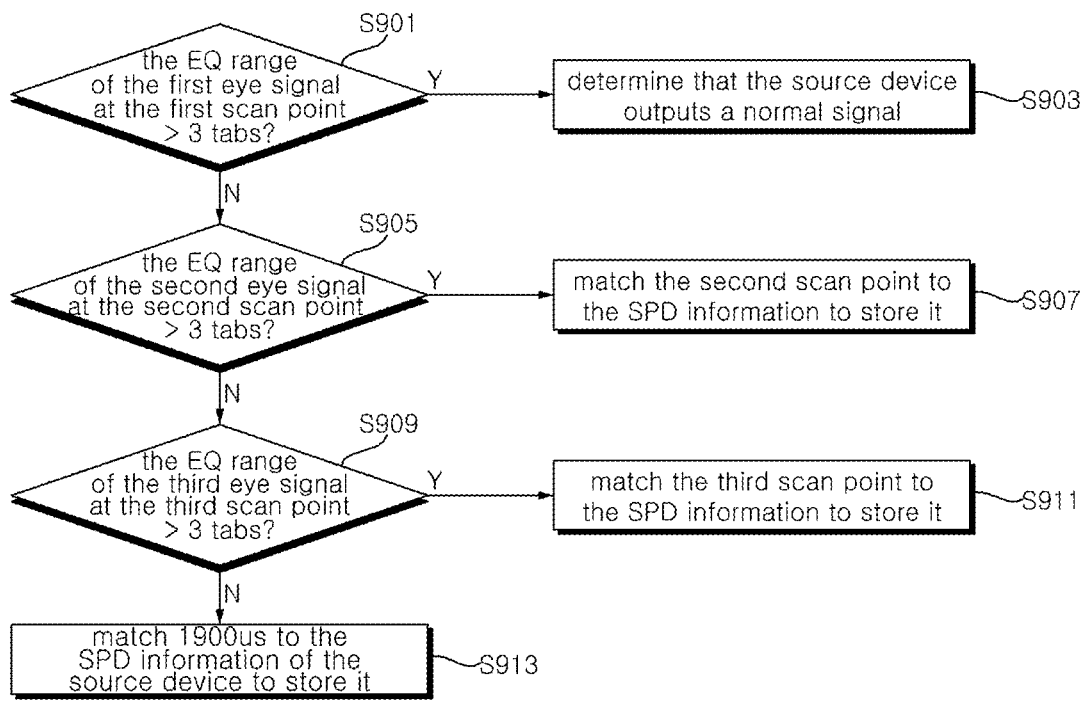
FIG. 9 is a diagram illustrating a specific process of obtaining a delay timing value according to an embodiment of the present disclosure.

FIG. 9 is a diagram illustrating a specific process of obtaining a delay timing value according to an embodiment of the present disclosure.

FIG. 9 is a diagram specifying step S609 of FIG. 6.

Referring to FIG. 9, the controller 170 may determine whether the EQ range of the first eye signal of the second signal is 3 tabs or more at the first scan point (S901).

If it is determined that the EQ range of the first eye signal corresponding to the second signal is 3 tabs or more at the first scan point, the controller 170 may determine that the source device 10 outputs a normal signal (S903).

If the EQ range of the first eye signal is less than 3 tabs at the time of the first scan, the controller 170 may determine whether the EQ range of the second eye signal is more than 3 tabs at the time of the second scan (S905).

The second scan point may be a point following the first scan point. The second scan point may be 500 us, but this is only an example.

If the controller 170 determines that the EQ range of the second eye signal is 3 tabs or more at the second scan point, the controller 170 may match the second scan point to the SPD information of the source device 10 to store it in the memory 140 (S907).

If the EQ range of the second eye signal is 3 tabs or more, the controller 170 may determine that the signal output from the source device 10 after the second scan point is a normal signal.

The controller 170 may match the second scan point to the SPD information of the source device 10 to store the second scan point in the memory 140.

If the EQ range of the second eye signal is less than 3 tabs at the second scan point, the controller 170 may determine whether the EQ range of the third eye signal is more than 3 tabs at the third scan point (S909).

The third scan point may be a time following the second scan point. The third scan point may be 1900 us, but this is only an example.

If the controller 170 determines that the EQ range of the third eye signal is 3 tabs or more at the third scan point, the controller 170 may match the third scan point to the SPD information of the source device 10 and store the third scan point in the memory 140 (S911).

If the EQ range of the third eye signal is 3 tabs or more, the controller 170 may determine that the signal output from the source device 10 after the third scan point is a normal signal.

The controller 170 may match the third scan point to the SPD information of the source device 10 and store the third scan point in the memory 140.

If the EQ range of the third eye signal is less than 3 tabs at the third scan point, the controller 170 may obtain 1900 us as a delay timing value and match 1900 us to the SPD information of the source device 10 to store it in memory 140 (S913).

The reason for obtaining a delay timing value of 1900 us is that in FRL mode, signal output from the source device (10) must be output by the sink device (20) within 2000 us, as defined in the HDMI 2.1 specification.

However, 1900 us is just an example and may be more than 2000 us at the time of the third scan.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications may be made.

What is claimed is:

1. A sink device, comprising:
   a memory configured to store identification information for each of a plurality of source devices and a delay timing value matched to the identification information;
   an external device interface configured to receive a signal output from an external source device through an HDMI (High-Definition Multimedia Interface) standard; and
   a controller configured to:
   obtain identification information of the external source device,
   determine whether a delay timing value matched to the identification information of the external source device is stored in the memory, wherein the delay timing value is a value indicating how much the signal received from the external source device will be delayed, and
   delay a first signal received from the external source device based on the delay timing value based on determining that the delay timing value matched to the identification information of the external source device is stored in the memory.

2. The sink device of claim 1, wherein the controller is further configured to delay the first signal received from the external source device by the delay timing value to output the delayed first signal.

3. The sink device of claim 1, wherein the controller is further configured to determine whether the first signal is unstable based on determining that the delay timing value matched to the identification information of the external source device is not stored.

4. The sink device of claim 3, wherein the controller is further configured to determine that the first signal is an unstable signal based on an equalizer range of an eye signal of the first signal being less than a preset range.

5. The sink device of claim 4, wherein the controller is further configured to request a signal output from the external source device based on the first signal being determined to be the unstable signal, and
   receive a second signal from the external source device according to a request.

6. The sink device of claim 5, wherein the controller is further configured to:
   scan the second signal to obtain a delay timing value in which an equalizer range of an eye signal of the second signal is less than the preset range, and match the obtained delay timing value to the identification information of the external source device to store the delay timing value in the memory.

7. The sink device of claim 6, wherein the controller is further configured to:
obtain a plurality of scan points where the equalizer range of the eye signal of the second signal is less than the preset range, and
obtain a smallest value among the plurality of scan points as the delay timing value.

8. The sink device of claim 1, wherein the identification information of the external source device includes SPD (Specific Product Description) information of the external source device.

9. The sink device of claim 2, wherein the controller is further configured to receive the first signal from the external source device through the external device interface under FRL (Fixed Rate Link) mode of an HDMI 2.1 standard.

10. An operating method of a sink device, the method comprising:
storing, in a memory, identification information for each of a plurality of source devices and a delay timing value matched to the identification information;
obtaining identification information of an external source device;
determining whether a delay timing value matched to the identification information of the external source device is stored in the memory, wherein the delay timing value is a value indicating how much a signal received from the external source device will be delayed; and
based on determining that the delay timing value matched to the identification information of the external source device is stored in the memory, delaying a first signal received from the external source device through an High-Definition Multimedia Interface (HDMI) standard based on the delay timing value.

11. The method of claim 10, wherein the delaying comprises:
delaying the first signal received from the external source device by the delay timing value to output the delayed first signal.

12. The method of claim 10, further comprising:
determining whether the first signal is unstable based on determining that the delay timing value matched to the identification information of the external source device is not stored.

13. The method of claim 12, wherein determining whether the first signal is unstable comprises:
determining that the first signal is an unstable signal based on an equalizer range of an eye signal of the first signal being less than a preset range.

14. The method of claim 13, further comprising:
requesting a signal output from the external source device based on the first signal being determined to be the unstable signal, and
receiving a second signal from the external source device according to a request.

15. The method of claim 14, further comprising:
scanning the second signal to obtain a delay timing value such that an equalizer range of an eye signal of the second signal is less than the preset range; and
matching the obtained delay timing value to the identification information of the external source device to store the delay timing value.

16. The method of claim 15, further comprising:
obtaining a plurality of scan points where the equalizer range of the eye signal of the second signal is less than the preset range, and
obtaining a smallest value among the plurality of scan points as the delay timing value.

17. The method of claim 10, wherein the identification information of the external source device includes SPD (Specific Product Description) information of the external source device.

18. The method of claim 11, wherein the first signal is received from the external source device under FRL (Fixed Rate Link) mode of an HDMI (High-Definition Multimedia Interface) 2.1 standard.

* * * * *